(12) United States Patent
Shinohara et al.

(10) Patent No.: US 11,674,473 B2
(45) Date of Patent: Jun. 13, 2023

(54) ENGINE AND WORK MACHINE

(71) Applicant: HONDA MOTOR CO., LTD., Tokyo (JP)

(72) Inventors: Toshiki Shinohara, Wako (JP); Takashi Suzuki, Wako (JP); Masanori Ishikawa, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/314,391

(22) Filed: May 7, 2021

(65) Prior Publication Data
US 2021/0262413 A1    Aug. 26, 2021

Related U.S. Application Data

(63) Continuation of application No. PCT/JP2018/042329, filed on Nov. 15, 2018.

(51) Int. Cl.
*F02F 3/00* (2006.01)
*F02F 3/26* (2006.01)
*F02B 23/08* (2006.01)
*F02B 23/10* (2006.01)

(52) U.S. Cl.
CPC .............. *F02F 3/26* (2013.01); *F02B 23/08* (2013.01); *F02B 2023/102* (2013.01)

(58) Field of Classification Search
CPC ............ F02B 2075/125; F02B 23/101; F02B 2275/40; F02F 1/14; F02F 1/40
USPC ..................................... 123/193.1
See application file for complete search history.

(56) References Cited

U.S. PATENT DOCUMENTS

| | | | | |
|---|---|---|---|---|
| 4,324,214 A | * | 4/1982 | Garcea | F02B 23/08 |
| | | | | 123/666 |
| 4,421,081 A | * | 12/1983 | Nakamura | F02P 15/02 |
| | | | | 123/310 |
| 4,508,073 A | | 4/1985 | Hofbauer et al. | |
| 4,549,508 A | * | 10/1985 | Fujimoto | F02B 25/14 |
| | | | | 123/193.5 |

(Continued)

FOREIGN PATENT DOCUMENTS

| JP | S58-022421 U | 2/1983 |
|---|---|---|
| JP | 2004-245204 A | 9/2004 |

(Continued)

OTHER PUBLICATIONS

International Search Report and Written Opinion for PCT/JP2018/042329 dated Feb. 5, 2019.

*Primary Examiner* — Long T Tran
*Assistant Examiner* — James J Kim
(74) *Attorney, Agent, or Firm* — Thomas | Horstemeyer, LLP (57) ABSTRACT

An engine includes a cylinder block in which a cylinder is formed, a piston arranged to be reciprocally movable in the cylinder, a cylinder head that is arranged on an upper side of the cylinder block and forms a combustion chamber between an inner peripheral surface of the cylinder and an upper surface of the piston, and an ignition plug arranged in the cylinder head. An inner peripheral portion of the cylinder head includes an inner peripheral side portion formed to be flush with the inner peripheral surface of the cylinder, and a tilting portion tilting from the upper surface of the piston to a side surface is formed on the piston.

8 Claims, 4 Drawing Sheets

(56) References Cited

U.S. PATENT DOCUMENTS

| | | | | |
|---|---|---|---|---|
| 4,570,589 | A * | 2/1986 | Fletcher | F02F 3/28 |
| | | | | 123/193.6 |
| 5,813,385 | A * | 9/1998 | Yamauchi | F02B 23/101 |
| | | | | 123/295 |
| 5,873,341 | A * | 2/1999 | Smith, Jr. | F01L 1/46 |
| | | | | 123/193.5 |
| 6,338,327 | B1 * | 1/2002 | Ogi | F02B 23/104 |
| | | | | 123/276 |
| 7,353,797 | B1 * | 4/2008 | Breidenthal | F02B 23/0675 |
| | | | | 123/263 |
| 2002/0179039 | A1 * | 12/2002 | Wuerfel | F02M 61/184 |
| | | | | 123/298 |
| 2004/0154579 | A1 * | 8/2004 | Montgomery | F02B 23/101 |
| | | | | 123/279 |
| 2014/0182571 | A1 * | 7/2014 | Takayanagi | F02B 33/30 |
| | | | | 123/73 PP |
| 2019/0226438 | A1 * | 7/2019 | Hotta | F02B 3/10 |

FOREIGN PATENT DOCUMENTS

| | | |
|---|---|---|
| JP | 2005-140005 A | 6/2005 |
| JP | 2016-121638 A | 7/2016 |
| WO | 2020/100262 A1 | 5/2020 |

\* cited by examiner

ENGINE AND WORK MACHINE

CROSS-REFERENCE TO RELATED APPLICATION(S)

This application is a continuation of International Patent Application No. PCT/JP2018/042329 filed on Nov. 15, 2018, the entire disclosure of which is incorporated herein by reference.

BACKGROUND OF THE INVENTION

Field of the Invention

The present invention relates to an engine applicable as a power source of a work machine, and a work machine.

Description of the Related Art

PTL 1 discloses a structure of a combustion chamber formed between a cylinder, the inner peripheral surface of a cylinder head, and the upper surface of a piston.

CITATION LIST

Patent Literature

PTL 1: Japanese Utility Model Laid-Open No. 58-022421

SUMMARY OF THE INVENTION

Technical Problem

In the structure of the combustion chamber disclosed in PTL 1, however, when the piston is located near the top dead center, a gap (quench area) where flame hardly propagates is formed between the inner peripheral portions of the cylinder and the cylinder head and the end portion of the upper surface of the piston.

In the quench area, even if flame propagates in the combustion chamber upon ignition of the ignition plug, the flame is cooled in the gap portion. For this reason, the temperature of the flame is lowered by the quenching action, and unburned substances are readily generated.

In consideration of the above-described problem, the present invention provides an engine including a combustion chamber structure capable of reducing a quench area in a combustion chamber, facilitating spread of flame in the combustion chamber, and reducing unburned substances in an exhaust gas.

Solution to Problem

According to an aspect of the present invention, there is provided an engine including a cylinder block in which a cylinder is formed, a piston arranged to be reciprocally movable in the cylinder, a cylinder head that is arranged on an upper side of the cylinder block and forms a combustion chamber between an inner peripheral surface of the cylinder and an upper surface of the piston, and an ignition plug arranged in the cylinder head, wherein an inner peripheral portion of the cylinder head includes an inner peripheral side portion formed to be flush with the inner peripheral surface of the cylinder, and a tilting portion tilting from the upper surface of the piston to a side surface is formed on the piston.

Advantageous Effects of Invention

According to the present invention, it is possible to reduce a quench area in a combustion chamber and facilitate spread of flame in the combustion chamber. This makes it possible to reduce unburned hydrocarbon (HC) and the like in an exhaust gas.

When the distance between the piston and the inner peripheral portion of the cylinder head is increased, lowering of the temperature of flame caused by the quenching action can be suppressed, and unburned substances can be reduced.

Other features and advantages of the present invention will be apparent from the following description taken in conjunction with the accompanying drawings. Note that the same reference numerals denote the same or like components throughout the accompanying drawings.

DESCRIPTION OF EMBODIMENTS

An embodiment of the present invention will now be described with reference to the accompanying drawings. Constituent elements described in the embodiment are merely examples and are not limited by the following embodiment.

(Outline of Engine)

Figure 1:
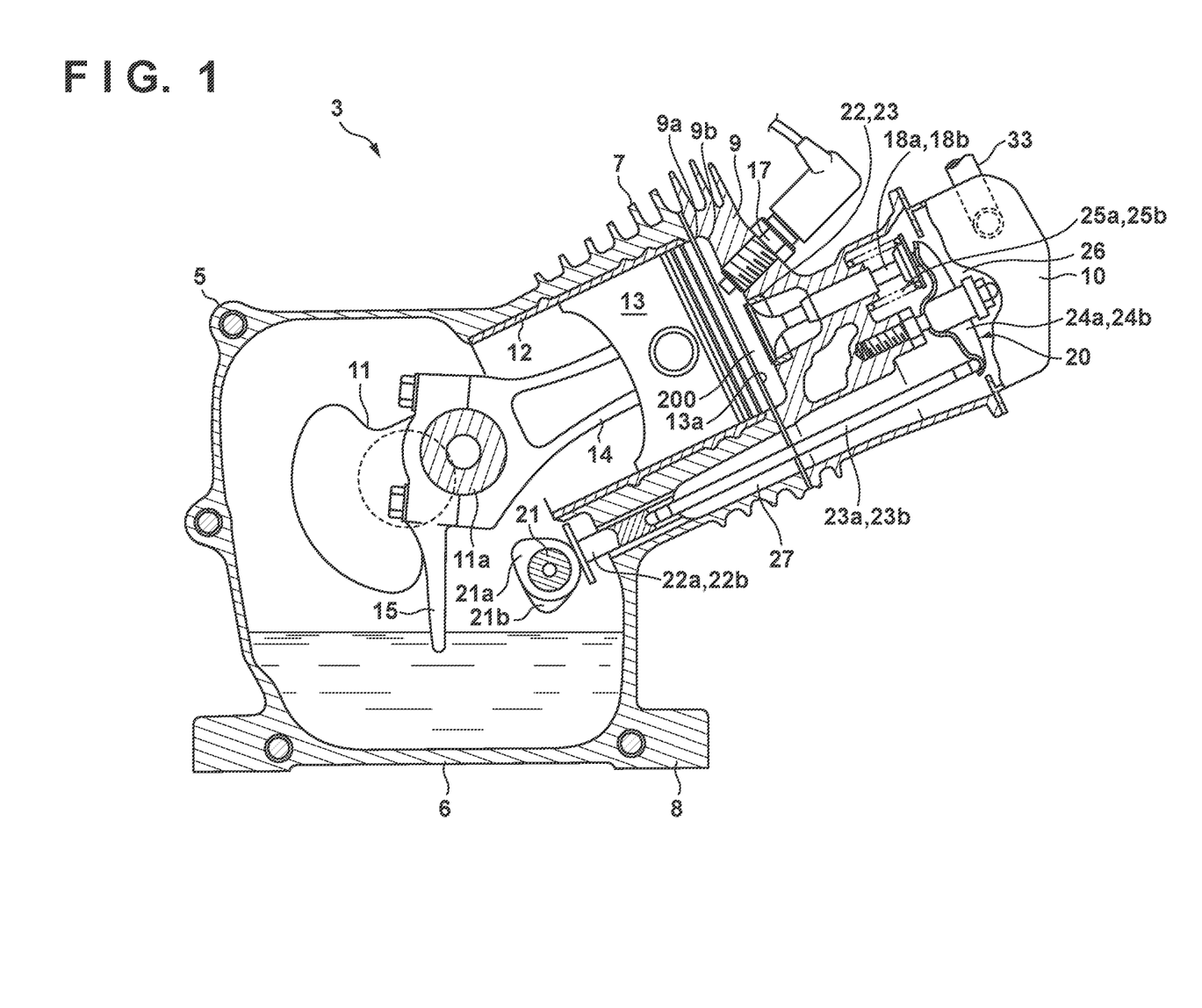
FIG. 1 is a sectional view showing the arrangement of an engine according to an embodiment.

FIG. 1 is a sectional view showing the arrangement of an engine (internal combustion engine) according to an embodiment. As shown in FIG. 1, the engine 3 includes a crank case 5 whose lower portion is formed into an oil pan 6, and a cylinder block 7 formed consecutively integrally with the upper portion of the crank case 5 and tilting to one side. A mounting base 8 is formed integrally with the oil pan 6 so as to project from the outer periphery. A cylinder head 9 is attached to the upper end of the cylinder block 7, and a head cover 10 is attached to the upper end of the cylinder head 9.

A crankshaft 11 is supported horizontally with respect to the crank case 5. The cylinder block 7 is arranged at a position tilting from a vertical line to the right side with respect to the axis of the crankshaft 11 as the center. With this arrangement, the total height of the engine 3 can be suppressed as small as possible.

A piston 13 stored in a cylinder 12 formed in the cylinder block 7 and a crank pin 11*a* of the crankshaft 11 are connected via a connecting rod 14. An oil dipper 15 is formed at the large end portion of the connecting rod 14 and configured to scatter stored oil 16 in the oil pan 6 during rotation of the crankshaft 11.

An ignition plug 17 is attached to the cylinder head 9. In a state in which the ignition plug 17 is attached, the electrode (to be referred to as the "distal end portion" hereinafter) of the ignition plug 17 projects into a combustion chamber 200. An intake valve seat 22 and an exhaust valve seat 23 on which a pair of an intake valve 18a and an exhaust valve 18b can sit, respectively, are formed on the inner peripheral portion of the cylinder head 9.

A valve device 20 that drives and opens/closes the intake valve 18a and the exhaust valve 18b is formed in a push rod/rocker arm type. That is, the valve device 20 includes an intake tappet 22a and an exhaust tappet 22b to be moved up and down by an intake cam 21a and an exhaust cam 21b, which are attached to a camshaft 21 supported by the crank case 5 and deceleration-driven from the crankshaft 11 via a timing gear (not shown), an intake push rod 23a and an exhaust push rod 23b, an intake rocker arm 24a and an exhaust rocker arm 24b, which connect the intake push rod 23a and the exhaust push rod 23b to the intake valve 18a and the exhaust valve 18b, respectively, and valve springs 25a and 25b that bias the intake valve 18a and the exhaust valve 18b in a closing direction, respectively.

The intake rocker arm 24a and the exhaust rocker arm 24b are stored in a rocker chamber 26 formed between the cylinder head 9 and the head cover 10. The intake tappet 22a and the exhaust tappet 22b, and the intake push rod 23a and the exhaust push rod 23b are stored in a rod chamber 27 formed in the tilting-direction side walls, that is, the lower walls of the cylinder block 7 and the cylinder head 9. Referring to FIG. 1, a breather pipe 33 makes the rocker chamber 26 communicate with the inside of an air cleaner of an intake system (not shown).

(Structure of Combustion Chamber)

Figure 2:
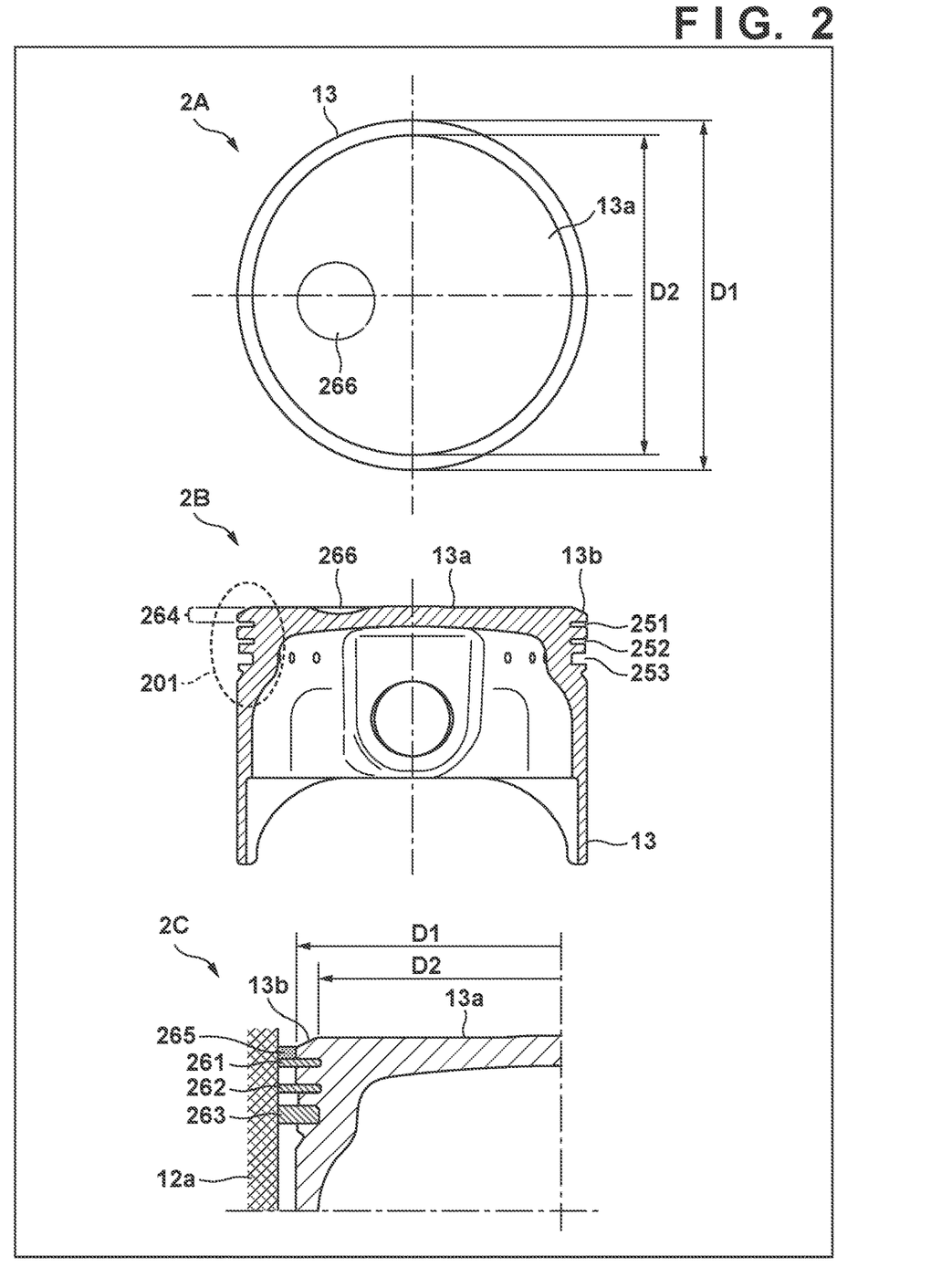
FIG. 2 is a view for explaining a piston that constitutes an engine combustion chamber according to the embodiment.

FIG. 2 is a view for explaining the structure of the piston 13 that constitutes the combustion chamber 200 of the engine 3 according to the embodiment, in which 2A is a plan view of the piston 13, 2B is a side sectional view of the piston 13, and 2C is an enlarged view of a broken line portion 201 in 2B.

As shown 2B of FIG. 2 and FIG. 2C, on the outer peripheral surface (side surface) of the piston 13, a first ring groove 251, a second ring groove 252, and a third ring groove 253 are sequentially provided downward from an upper surface 13a of the piston 13. A first piston ring 261, a second piston ring 262, and a third piston ring 263, which come into slidable contact with an inner peripheral surface 12a of the cylinder 12, can be attached to the ring grooves. On the outer peripheral surface (side surface) of the piston 13, a portion from the upper surface 13a of the piston 13 to the upper edge of the first ring groove 251 (the upper surface of the first piston ring 261) is called a top land portion 264.

A tilting portion 13b tilting from the upper surface 13a of the piston 13 to the side surface is formed on the piston 13. The tilting portion 13b is formed from the upper surface 13a of the piston 13 toward the upper surface of the piston ring (the upper surface of the first piston ring 261) attached to the position closest to the upper surface 13a of the piston 13. A diameter D2 of the upper surface 13a of the piston 13 is smaller than an outer diameter D1 of the piston 13. The tilting portion 13b is constituted by a curved surface formed with a predetermined radius of curvature between the upper surface 13a of the piston and the upper edge of the first ring groove 251.

When the tilting portion 13b is formed, flame that propagates in the combustion chamber 200 can easily spread to a space 265 between the top land portion 264 of the piston 13, which is the peripheral portion of the combustion chamber 200, and the inner peripheral surface 12a of the cylinder 12. The quench area can be further reduced by guiding the flame to the space 265 up to the upper surface of the sliding portion (first piston ring 261 (top ring)) with respect to the cylinder 12.

Also, as shown in 2A of FIG. 2, a concave portion 266 is formed in the upper surface 13a of the piston 13 at a position facing the distal end portion of the ignition plug 17. When the concave portion 266 is formed to expand the relative position between the distal end portion of the ignition plug 17 and the upper surface 13a of the piston 13, it is possible to facilitate spread of flame in the combustion chamber 200 with respect to the distal end portion of the ignition plug 17 as the center.

Figure 3A:
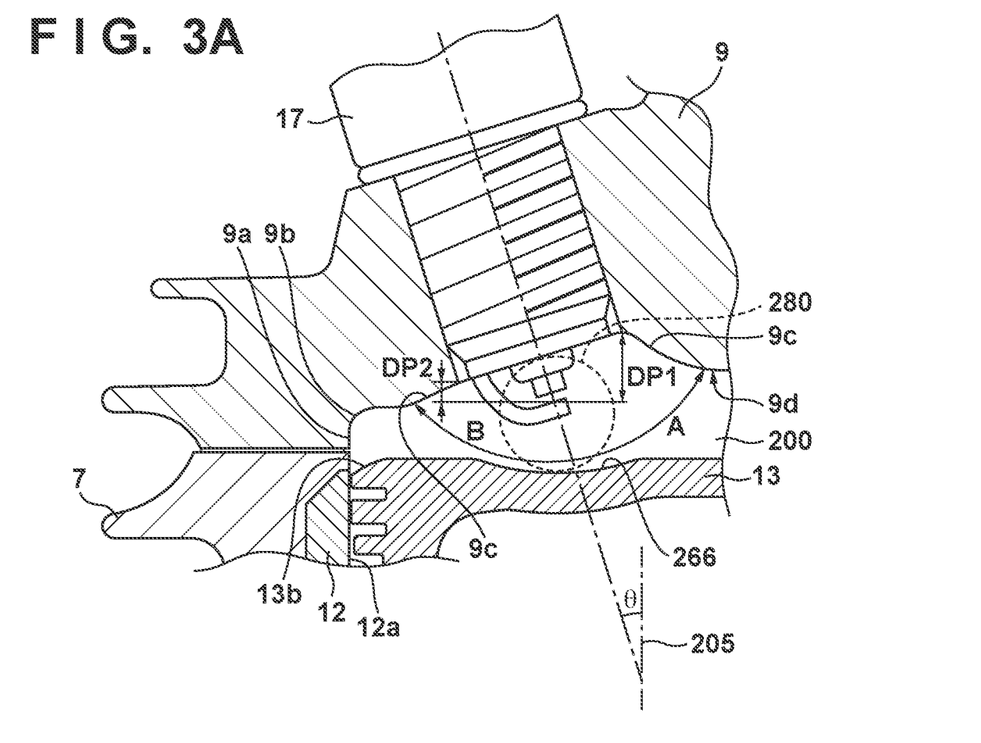
FIG. 3A is a view for explaining the combustion chamber structure of the engine according to the embodiment.
Figure 3B:
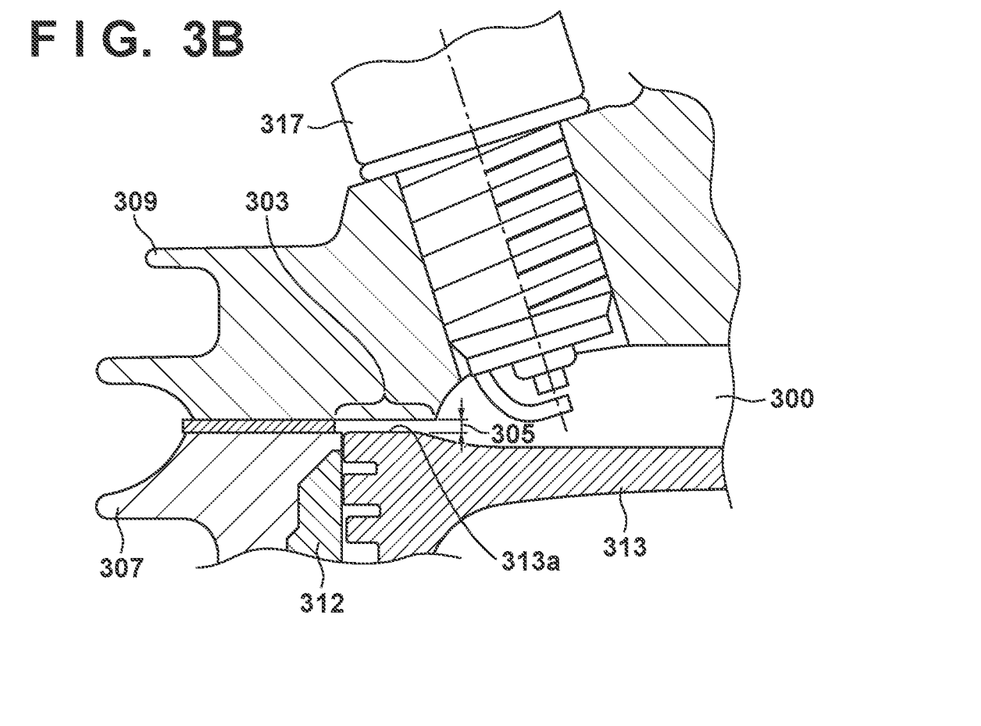
FIG. 3B is a view for explaining the combustion chamber structure of an engine according to a comparative example.

FIG. 3A is a view for explaining the structure of the combustion chamber 200 of the engine 3 according to embodiment, and FIG. 3B is a view for explaining the combustion chamber structure of an engine according to a comparative example.

As shown in FIG. 3A, as the structure of the combustion chamber 200, the engine 3 includes the cylinder block 7 in which the cylinder 12 is formed, the piston 13 arranged to be reciprocally movable in the cylinder 12, and the cylinder head 9 that is arranged on the upper side of the cylinder block 7 and forms the combustion chamber 200 between the inner peripheral surface 12a of the cylinder 12 and the upper surface 13a of the piston 13. The ignition plug 17 is arranged in the cylinder head 9 at a predetermined tilting angle θ with respect to an axis 205 (an axis in the vertical direction) of the piston 13.

In the combustion chamber 200 according to this embodiment, an inner peripheral portion 9d of the cylinder head 9 includes an inner peripheral side portion 9a formed to be flush with the inner peripheral surface 12a of the cylinder 12. The inner peripheral side portion 9a is linearly extended upward in the vertical direction.

On the other hand, the structure of a combustion chamber 300 according to the comparative example shown in FIG. 3B includes a cylinder block 307 in which a cylinder 312 is formed, and a cylinder head 309 arranged on the upper side of the cylinder block 307.

On the lower surface of the cylinder head 309, a projecting portion 303 projecting in the horizontal direction with respect to the inner peripheral surface of the cylinder 312 is formed. When a piston 313 is located near the top dead center, a gap 305 (quench area) is formed between the projecting portion 303 and an upper surface 313a of the piston 313. Even if flame propagates in the combustion chamber 300 upon ignition of an ignition plug 317, the flame is cooled in the gap 305. For this reason, the temperature of the flame is lowered by the quenching action, and unburned substances are readily generated.

As shown in FIG. 3A, in the combustion chamber 200 according to this embodiment, a component corresponding to the projecting portion 303 in the comparative example shown in FIG. 3B is eliminated, and the inner peripheral side portion 9a that expands the inner peripheral portion 9d of the cylinder head 9 upward in the vertical direction is formed. Also, as described with reference to FIG. 2, the tilting portion 13b tilting from the upper surface 13a of the piston 13 to the side surface is formed on the piston 13.

According to the structure of the combustion chamber 200 of this embodiment including the inner peripheral side portion 9a and the tilting portion 13b, it is possible to facilitate spread of flame in the combustion chamber. An air-fuel mixture in the combustion chamber 200 is ignited by spark ignition of the ignition plug 17. Flame generated by this radially spreads and quickly propagates to the peripheral portion of the combustion chamber 200, that is, the inner peripheral side portion 9a, the tilting portion 13b, and the top land portion 264 (2B of FIG. 2). Hence, combustion of the air-fuel mixture can be quickly and reliably performed in the whole combustion chamber 200, and this makes it possible to reduce unburned hydrocarbon (HC) and the like in the exhaust gas. That is, when the relative distance between the piston 13 and the inner peripheral portion of the cylinder head 9 is increased, lowering of the temperature of flame caused by the quenching action can be suppressed, and unburned substances can be reduced.

Also, in the combustion chamber 200 according to this embodiment, an arc portion 9b formed in a direction of separating from the upper surface 13a of the piston 13 is formed at the upper end (upper portion) of the inner peripheral side portion 9a of the cylinder head 9. One end of the arc portion 9b is formed integrally with the upper end (upper portion) of the inner peripheral side portion 9a without any step difference. When the arc portion 9b is formed at the upper end of the inner peripheral side portion 9a, it is possible to smoothly spread flame on the side of the cylinder head 9 and facilitate spread of the flame in the peripheral portion (the inner peripheral side portion 9a, the tilting portion 13b, and the top land portion 264) of the combustion chamber 200.

In addition, the inner peripheral portion 9d of the cylinder head 9 includes, at a position where the distal end portion of the ignition plug 17 projects into the combustion chamber 200, a recessed portion 9c formed into an arc shape in a direction of separating from the upper surface 13a of the piston 13 (in a direction of separating from the distal end portion of the ignition plug 17). One end of the arc portion 9b is formed integrally with the inner peripheral side portion 9a without any step difference, and the other end of the arc portion 9b is formed integrally with the recessed portion 9c without any step difference.

An air-fuel mixture in the combustion chamber 200 is ignited by spark ignition by the ignition plug 17, and flame generated by this radially spreads. When the recessed portion 9c is provided, it is possible to suppress lowering of the temperature of flame caused by contact with the inner peripheral portion 9d of the cylinder head 9 and facilitate spread of flame in the combustion chamber 200 with respect to the distal end portion of the ignition plug 17 as the center.

Figure 4:
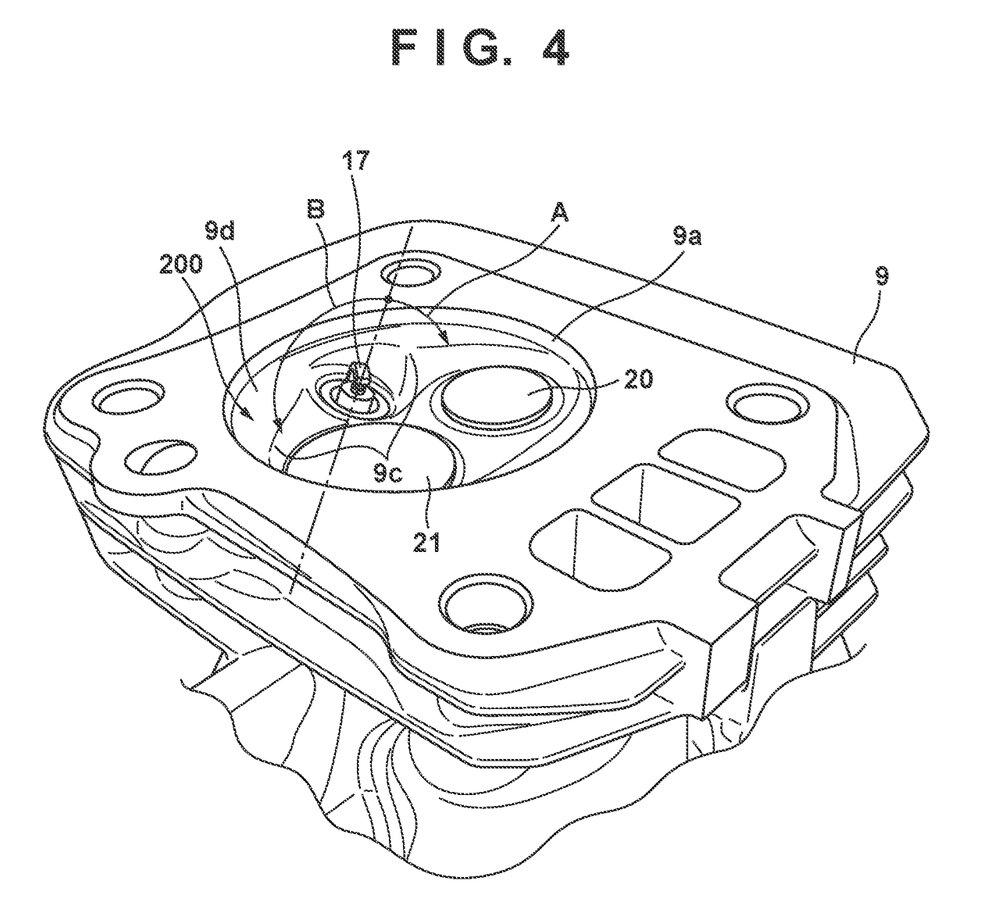
FIG. 4 is a bottom view of a cylinder block according to the embodiment.

FIG. 4 is a bottom view of the cylinder head 9 viewed from the electrode side of the ignition plug 17. As shown in FIG. 3A, the ignition plug 17 is arranged in the cylinder head 9 at the predetermined tilting angle θ with respect to the axis 205 (the axis in the vertical direction), and the depth of the recessed portion 9c changes in accordance with the tilting direction of the ignition plug 17.

In a direction in which the distal end portion of the ignition plug 17 approaches the inner peripheral portion 9d of the cylinder head 9 (the direction of an arrow A in FIGS. 3A and 4), the depth of the recessed portion 9c is formed to be larger than the depth of the recessed portion 9c in a direction in which the distal end portion of the ignition plug 17 separates from the inner peripheral portion 9d (the direction of an arrow B in FIGS. 3A and 4. As shown in FIG. 3A, a depth DP1 of the recessed portion formed on the side of the arrow A with reference to the distal end portion of the ignition plug 17 is formed to be larger than a depth DP2 of the recessed portion formed on the side of the arrow B.

In the direction in which the distal end portion of the ignition plug 17 approaches the inner peripheral portion of the cylinder head 9 (the direction of the arrow A), flame generated by spark ignition of the ignition plug 17 readily contacts the inner peripheral portion 9d. For this reason, in the direction in which the distal end portion of the ignition plug 17 approaches the inner peripheral portion 9d of the cylinder head 9, the depth DP1 of the recessed portion 9c is formed to be larger than the depth DP2 of the recessed portion 9c in the direction in which the distal end portion of the ignition plug 17 separates from the inner peripheral portion 9d (that is, the relationship between the depths of the recessed portion 9c satisfies DP1>DP2), thereby suppressing lowering of the temperature of the flame caused by contact with the inner peripheral portion 9d of the cylinder head 9 and facilitating spread of the flame in the combustion chamber 200 with respect to the distal end portion of the ignition plug 17 as the center.

As shown in FIG. 3A, the concave portion 266 is formed in the upper surface 13a of the piston 13 at a position facing the distal end portion of the ignition plug 17, and the concave portion 266 is formed in a direction of separating from the distal end portion of the ignition plug 17. When the relative position (interval) between the distal end portion of the ignition plug 17 and the upper surface 13a of the piston 13 is expanded, it is possible to facilitate spread of flame in the combustion chamber 200 with respect to the distal end portion of the ignition plug 17 as the center.

As shown in FIG. 3A, when the piston 13 is located at the position of the top dead center or at a position near the top dead center, a substantially spherical space 280 is formed in the combustion chamber 200 between the recessed portion 9c of the cylinder head 9 and the concave portion 266 of the piston 13, as indicated by a broken line. According to the structure of the combustion chamber 200, when an air-fuel mixture in the combustion chamber 200 is ignited by spark ignition by the ignition plug 17, generated flame radially spreads, and radial flame spreading with respect to the ignition plug 17 as the center can be formed in the combustion chamber 200.

The engine 3 can be applied as a power source of various work machines. As the work machine, the engine can be applied to, for example, a cultivator used in, for example, a cultivating operation of cultivating a field or the like, a pump apparatus (water pump) used in, for example, various kinds of water suction/draining operations or the like, a high-pressure washing machine used in a washing operation of washing off dirt using water sprayed under a high pressure, a spraying apparatus (sprayer) used in a spraying operation of spraying a drug or the like, and a rolling compaction apparatus (compactor) used in a rolling compaction operation of compacting a paving surface.

When the engine 3 according to the embodiment is used as a power source of a work machine (a cultivator, a water pump, a high-pressure washing machine, a sprayer, a compactor, or the like), a work machine that reduces unburned substances, for example, hydrocarbon (HC) and the like in an exhaust gas can be provided.

Summary of Embodiment

Arrangement 1. An engine according to the above-described embodiment is an engine (for example, 3 in FIG. 1) including a cylinder block (for example, 7 in FIGS. 1 and 3A) in which a cylinder (for example, 12 in FIGS. 1 and 3A) is formed, a piston (for example, 13 in FIGS. 1 and 3A) arranged to be reciprocally movable in the cylinder (12), a cylinder head (for example, 9 in FIGS. 1 and 3A) that is arranged on an upper side of the cylinder block (7) and forms a combustion chamber (for example, 200 in FIGS. 1 and 3A) between an inner peripheral surface (for example, 12a in FIG. 3A) of the cylinder (12) and an upper surface (for example, 13a in FIGS. 1 and 3A) of the piston (13), and an ignition plug (for example, 17 in FIGS. 1 and 3A) arranged in the cylinder head (9), wherein an inner peripheral portion (for example, 9d in FIG. 3A) of the cylinder head (9) includes an inner peripheral side portion (for example, 9a in FIGS. 1 and 3A) formed to be flush with the inner peripheral surface (12a) of the cylinder (12), and a tilting portion (for example, 13b in FIG. 3A) tilting from the upper surface (for example, 13a in FIGS. 1 and 3A) of the piston to a side surface is formed on the piston (13).

According to the engine of Arrangement 1, it is possible to reduce a quench area in the combustion chamber and facilitate spread of flame in the combustion chamber. This makes it possible to reduce unburned hydrocarbon (HC) and the like in an exhaust gas.

When the relative distance between the piston and the inner peripheral portion of the cylinder head is increased, lowering of the temperature of flame caused by the quenching action can be suppressed, and unburned substances can be reduced.

Arrangement 2. In the engine (3) according to the above-described embodiment, the tilting portion (13b) is formed from the upper surface (13a) of the piston (13) toward an upper surface of a piston ring (for example, 261 in 2C of FIG. 2) attached to a position closest to the upper surface of the piston.

According to the engine of Arrangement 2, the quench area can be further reduced by guiding the flame to the space up to the upper surface of the sliding portion (piston ring (top ring)) with respect to the cylinder.

Arrangement 3. In the engine (3) according to the above-described embodiment, an arc portion (for example, 9b in FIGS. 1 and 3A) formed in a direction of separating from the upper surface (13a) of the piston (13) is formed at an upper end of the inner peripheral side portion (9a).

According to the engine of Arrangement 3, when the arc portion is formed at the upper end of the inner peripheral side portion, it is possible to smoothly spread flame on the cylinder head side and facilitate spread of the flame on the periphery of the inner peripheral side portion.

Arrangement 4. In the engine (3) according to the above-described embodiment, the inner peripheral portion (for example, 9d in FIGS. 3A and 4) of the cylinder head (9) includes a recessed portion (for example, 9c in FIGS. 3A and 4) formed into an arc shape at a position where a distal end portion of the ignition plug (17) projects into the combustion chamber (200).

According to the engine of Arrangement 4, when the recessed portion is provided, it is possible to suppress lowering of the temperature of flame caused by contact with the inner peripheral portion of the cylinder head and facilitate spread of flame in the combustion chamber with respect to the ignition plug as the center.

Arrangement 5. In the engine (3) according to the above-described embodiment, the ignition plug (17) is arranged in the cylinder head at a predetermined tilting angle with respect to an axis of the piston (13), and a depth of the recessed portion (9c) changes in accordance with a tilting direction (for example, the direction of an arrow A and the direction of an arrow B in FIGS. 3A and 4) of the ignition plug.

According to the engine of Arrangement 5, when the cylinder head is formed such that the depth of the recessed portion changes in accordance with the tilting direction of the ignition plug, it is possible to suppress lowering of the temperature of flame caused by contact with the inner peripheral portion of the cylinder head and facilitate spread of flame in the combustion chamber with respect to the ignition plug as the center.

Arrangement 6. In the engine (3) according to the above-described embodiment, in a direction in which the distal end portion of the ignition plug (17) approaches the inner peripheral portion (9d) of the cylinder head (9), the depth (for example, DP1 in FIG. 3A) of the recessed portion (9c) is formed to be larger than the depth (for example, DP2 in FIG. 3A) of the recessed portion (9c) in a direction in which the distal end portion of the ignition plug (17) separates from the inner peripheral portion (9d) (for example, the relationship between the depths of the recessed portion 9c satisfies DP1>DP2).

According to the engine of Arrangement 6, in the direction in which the distal end portion of the ignition plug approaches the inner peripheral portion of the cylinder head, flame readily contacts the inner peripheral portion. For this reason, in the direction, the depth of the recessed portion is formed to be larger than the depth of the recessed portion in the direction of separating, thereby suppressing lowering of the temperature of the flame caused by contact with the inner peripheral portion of the cylinder head and facilitating spread of the flame in the combustion chamber with respect to the distal end portion of the ignition plug as the center.

Arrangement 7. In the engine (3) according to the above-described embodiment, a concave portion (for example, 266 in FIGS. 2 and 3A) is formed in the upper surface (13a) of the piston (13) at a position facing the distal end portion of the ignition plug (17).

According to the engine of Arrangement 7, when the relative position between the distal end portion of the ignition plug and the piston upper surface is expanded, it is possible to facilitate spread of flame in the combustion chamber with respect to the ignition plug as the center.

Arrangement 8. In the engine (3) according to the above-described embodiment, the concave portion (266) is formed in a direction of separating from the distal end portion of the ignition plug (17).

According to the engine of Arrangement 8, when the relative position between the distal end portion of the ignition plug and the piston upper surface is expanded, it is possible to facilitate spread of flame in the combustion chamber with respect to the ignition plug as the center.

Arrangement 9. In the engine (3) according to the above-described embodiment, when the piston (13) is located at a position of a top dead center, a substantially spherical space (for example, 280 in FIG. 3A) is formed in the combustion chamber (200) between the recessed portion (9c) and the concave portion (266).

According to the engine of Arrangement 9, it is possible to form flame spreading with respect to the ignition plug as the center in the combustion chamber.

Arrangement 10. A work machine (for example, a cultivator, a water pump, a high-pressure washing machine, a sprayer, a compactor, or the like) according to the above-described embodiment comprises an engine (3) according to the above-described embodiment as a power source.

According to the work machine of Arrangement 10, it is possible to provide a work machine that reduces unburned substances, for example, hydrocarbon (HC) and the like in an exhaust gas by using the engine according to the embodiment as the power source of the work machine.

The present invention is not limited to the above embodiments and various changes and modifications can be made within the spirit and scope of the present invention. Therefore, to apprise the public of the scope of the present invention, the following claims are made.

What is claimed is:

1. An engine including a cylinder block in which a cylinder is formed, a piston arranged to be reciprocally movable in the cylinder, a cylinder head that is arranged on an upper side of the cylinder block and forms a combustion chamber between an inner peripheral surface of the cylinder and an upper surface of the piston, and an ignition plug arranged in the cylinder head, wherein an inner peripheral portion of the cylinder head includes:

a recessed portion formed into an arc shape in a direction of separating from the upper surface of the piston at a position where the distal end portion of the ignition plug projects into the combustion chamber;

an inner peripheral side portion formed to be flush with the inner peripheral surface of the cylinder, a tilting portion tilting from the upper surface of the piston to a side surface is formed on the piston, an arc portion formed in a direction of separating from the upper surface of the piston is formed at an upper end of the inner peripheral side portion of the cylinder head, one end of the arc portion is formed integrally without any step difference with an upper portion of the inner peripheral side portion formed in a vertical direction with respect to the upper surface of the piston, the other end of the arc portion includes a first horizontal portion which is extended in a horizontal direction with respect to the upper surface of the piston and formed integrally without any step difference with an end portion of the recessed portion, and in a direction in which the distal end portion of the ignition plug approaches the inner peripheral portion of the cylinder head, the recessed portion includes an arc shape projected in a direction of closing to the upper surface of the piston and a second horizontal portion which is formed integrally without any step difference with an end portion of the arc shape and extended in a horizontal direction with respect to the upper surface of the piston.

2. The engine according to claim 1, wherein the tilting portion is formed from the upper surface of the piston toward an upper surface of a piston ring attached to a position closest to the upper surface of the piston.

3. The engine according to claim 1, wherein the ignition plug is arranged in the cylinder head at a predetermined tilting angle with respect to an axis of the piston, and a depth of the recessed portion is formed relative to a tilting direction of the ignition plug.

4. The engine according to claim 1, wherein in a direction in which the distal end portion of the ignition plug approaches the inner peripheral portion of the cylinder head, the depth of the recessed portion is formed to be larger than the depth of the recessed portion in a direction of separating from the inner peripheral portion.

5. The engine according to claim 1, wherein the concave portion is formed in the upper surface of the piston at a position facing the distal end portion of the ignition plug.

6. The engine according to claim 5, wherein the concave portion is formed in a direction of separating from the distal end portion of the ignition plug.

7. The engine according to claim 5, wherein when the piston is located at a position of a top dead center, a substantially spherical space is formed in the combustion chamber between the recessed portion and the concave portion.

8. A work machine comprising an engine defined in claim 1 as a power source.

* * * * *